United States Patent [19]
Coffield et al.

[11] Patent Number: 5,549,736
[45] Date of Patent: Aug. 27, 1996

[54] MODULAR, STACKABLE PRESSURE SWING ABSORPTION CONCENTRATOR

[75] Inventors: Kelly M. Coffield, Davenport; Dean A. Cantrill, Bettendorf; Kevin G. McCulloh, Davenport; Sammy K. Mickelson, Bettendorf, all of Iowa

[73] Assignee: Litton Systems, Inc., Woodland Hills, Calif.

[21] Appl. No.: 497,452

[22] Filed: Jun. 30, 1995

Related U.S. Application Data

[63] Continuation of Ser. No. 183,622, Jan. 19, 1994, abandoned.

[51] Int. Cl.$^6$ ............................................. B01D 53/047
[52] U.S. Cl. ............................. 96/133; 96/137; 96/149
[58] Field of Search ........................... 96/121, 130–133, 96/136, 137, 149, 108; 55/518

[56] References Cited

U.S. PATENT DOCUMENTS

| | | | |
|---|---|---|---|
| 1,593,137 | 7/1926 | O'Rourke et al. | 96/131 |
| 2,080,578 | 5/1937 | Ray | 96/130 |
| 2,640,558 | 6/1953 | Dauphinee | 96/133 |
| 2,678,108 | 5/1954 | Reid | 96/133 |
| 2,699,287 | 1/1955 | Daninhirsch | 96/133 |
| 2,951,551 | 9/1960 | West | 96/133 |
| 3,029,581 | 4/1962 | Robbins | 96/136 |
| 3,186,148 | 6/1965 | Merrill et al. | 96/131 |
| 3,258,899 | 7/1966 | Coffin | 96/130 X |
| 3,323,291 | 6/1967 | Kern | 96/130 X |
| 3,323,292 | 6/1967 | Brown | 96/130 X |
| 3,324,631 | 6/1967 | Kreuter | 96/130 X |
| 3,464,186 | 9/1969 | Hankison et al. | 96/137 X |
| 3,955,946 | 5/1976 | Führing et al. | 96/133 |
| 4,155,849 | 5/1979 | Baierl | 96/131 X |
| 4,371,384 | 2/1983 | McCombs | 96/130 X |
| 4,373,938 | 2/1983 | McCombs | 96/130 X |
| 4,509,959 | 4/1985 | McCombs | 96/130 X |
| 4,631,073 | 12/1986 | Null et al. | 96/130 X |
| 4,673,420 | 6/1987 | Haker et al. | 96/133 X |
| 4,802,899 | 2/1989 | Vrana et al. | 96/130 X |
| 4,877,429 | 10/1989 | Hunter | 96/130 X |
| 4,927,434 | 5/1990 | Cordes et al. | 96/130 X |
| 5,112,367 | 5/1992 | Hill | 96/130 X |

FOREIGN PATENT DOCUMENTS

| | | | |
|---|---|---|---|
| 2550466 | 2/1985 | France | 96/133 |
| 2924052 | 12/1980 | Germany | 96/130 |
| 0288531 | 4/1991 | Germany | 96/130 |
| 0288532 | 4/1991 | Germany | 96/130 |
| 4320942 | 1/1995 | Germany | 96/108 |
| 53-082663 | 7/1978 | Japan | 96/130 |
| 54-125181 | 7/1979 | Japan | 96/131 |
| 4-122411 | 2/1992 | Japan | 96/130 |
| 0128754 | 1/1960 | U.S.S.R. | 96/121 |
| 0694741 | 10/1979 | U.S.S.R. | 96/133 |
| 2232364 | 12/1960 | United Kingdom | 96/133 |

*Primary Examiner*—Robert Spitzer
*Attorney, Agent, or Firm*—Gerald L. Lett

[57] ABSTRACT

A modular, pneumatically parallel arrangement of sieve beds for a pressure swing adsorption gas concentration apparatus is described. A manifold head structure having a plurality of ports, channels and components which are connected together forms the pneumatic circuit for the pressure swing adsorption process. The manifold structures are arranged so as to be simply connected together to modularly form a pressure swing adsorption apparatus of the desired capacity.

1 Claim, 4 Drawing Sheets

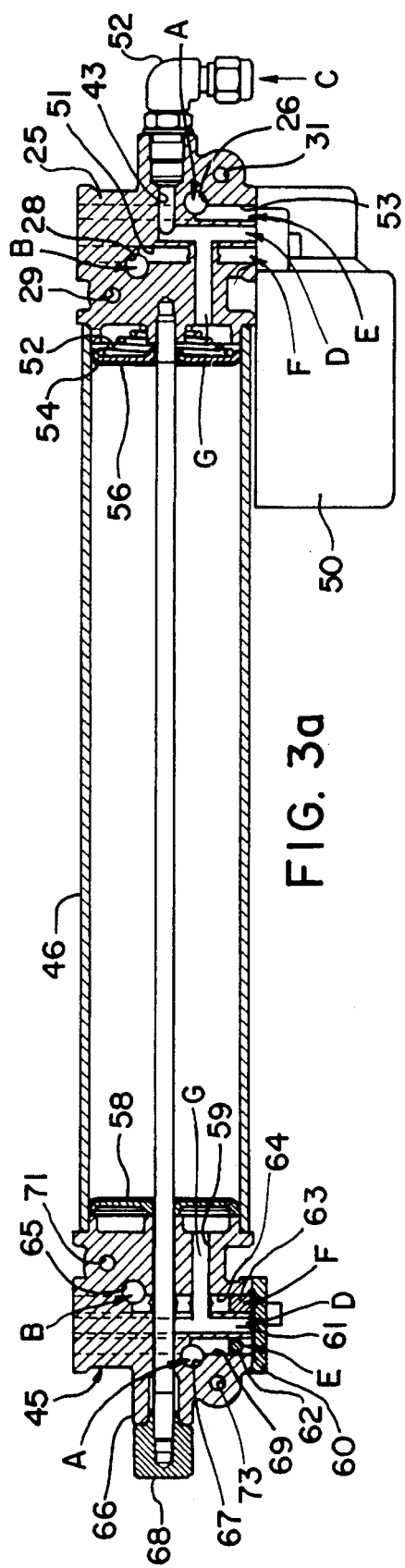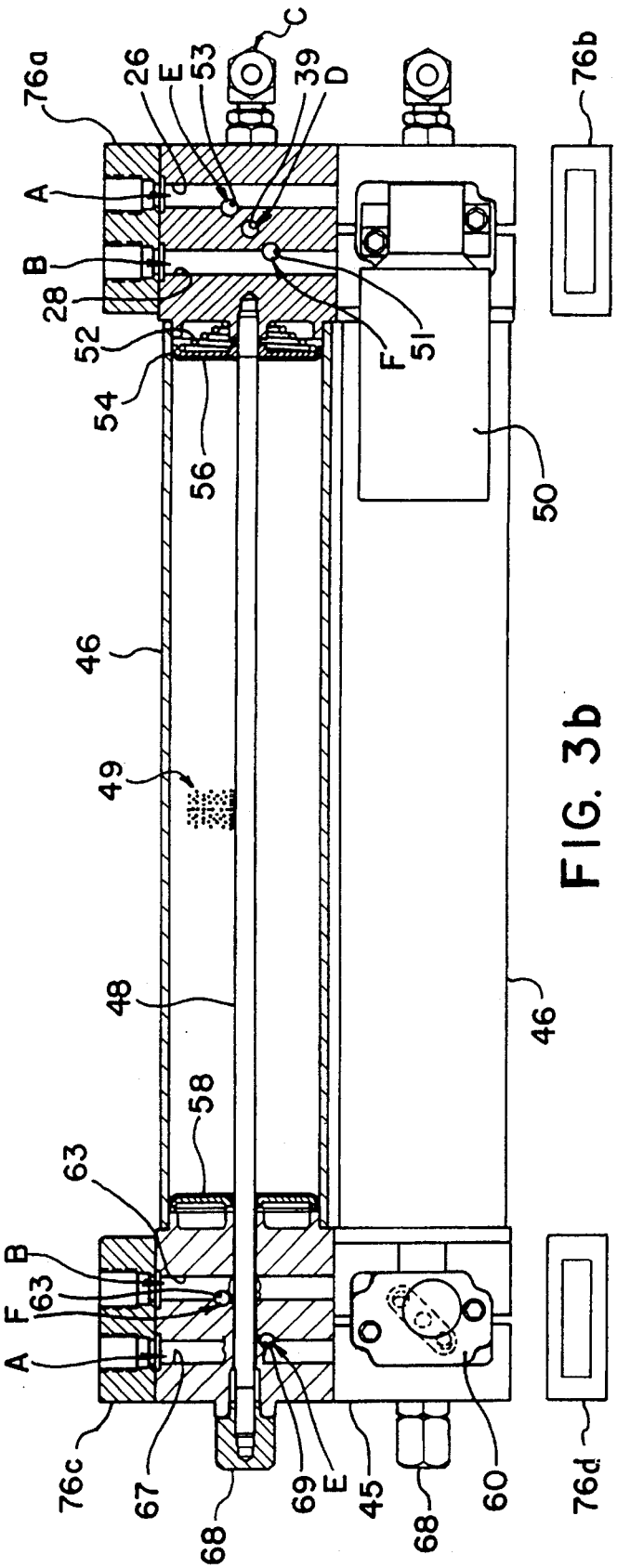

5,549,736

MODULAR, STACKABLE PRESSURE SWING ABSORPTION CONCENTRATOR

This application is a Continuation of application Ser. No. 08/183,622 filed Jan. 19, 1994, now abandoned.

BACKGROUND OF THE INVENTION

This invention relates to a pressure swing adsorption apparatus for generating product gas, and in particular, relates to an arrangement of pneumatic components for such apparatus which permits the sieve beds or adsorber columns to be arranged in a modular fashion.

The use of concentrators of the pressure swing adsorber type to produce an enriched product gas is well known. This technology has found its principal application in the field of oxygen concentrators for home health care use. There are numerous large scale industrial applications wherein pressure swing adsorption principles are used to generate supplies of oxygen or nitrogen. Perhaps the most visible use of this technique is in oxygen concentration aboard civilian or military aircraft.

Pressure swing adsorption (PSA) gas concentrators adsorb undesired gases in a compressed air stream. For example, a well known way in which this process is used involves applying compressed air to a first adsorber column which is filled with molecular sieve. As the compressed air flows through the column, the undesired gasses are adsorbed by the molecular sieve, while the desired gas is allowed to pass through the column, where it is extracted as concentrated product gas. When that first column has produced a predetermined amount of gas, the compressed airstream is applied to a second or opposing adsorber column which has previously been regenerated. The second column then becomes the active adsorber concentrating the desired gas while the first column is being regenerated.

Regeneration occurs simply by venting an adsorber column to the atmosphere, which causes the previously adsorbed gasses to escape and diffuse out of the system as vent gas. To further aid regeneration, a small amount of product gas from the opposing adsorber column is used to purge any residual gasses present in the adsorber column being regenerated.

At this point, the first adsorber column is regenerated and again ready to be exposed to the compressed air source and to concentrate gas. This cyclical process repeats to continuously concentrate gas in a regenerative fashion requiring no consumable or expendable materials.

The varying applications of the PSA process, as described above, cause widely varying requirements for the capacity of the PSA apparatus to be used. Heretofore, in order to meet these varying capacity requirements it has generally been necessary to custom design and manufacture the appropriate PSA apparatus, and if capacity requirements changed, an entirely new apparatus had to be assembled. Each requirement has in general resulted in the need for a completely changed assemblage of components including pneumatic fittings, tubes, sealants and the like. It would be desirable to be able to provide a PSA gas concentrator apparatus which is, for example, of modular construction so that the apparatus can be readily modified to meet changing needs.

It is therefore, an object of this invention to provide apparatus for meeting a variety of industrial gas requirements using pressure swing adsorption gas concentrator techniques.

Another object of this invention is to provide a structural arrangement for pressure swing adsorption gas concentration apparatus by which sieve beds can be stacked, as necessary, in a modular fashion to create the capacity needed for a given application.

A further object of this invention is to provide a manifold head structure for adsorber columns used in pressure swing adsorption gas concentration apparatus, which contains all the pneumatic components and provides for all the interconnecting of the ports and passages of the pneumatic logic circuit necessary to carry out the PSA process and which can simply be connected together to form a PSA apparatus of a desired capacity.

SUMMARY OF THE INVENTION

The foregoing and other objects are obtained in a modular arrangement of sieve beds for a pressure swing adsorption gas concentration apparatus. The modular construction is made possible by a novel manifold head structure for the adsorber column having a plurality of ports, channels and components which when connected together forms the pneumatic circuit for the PSA process. In addition, the novel head structure provides the pneumatic logic circuitry for accomplishing the PSA process in the desired manner. These manifold or head structures are simply connected together to be in a pneumatically parallel arrangement, such as by bolting, and along with the sieve beds or adsorber columns attached thereto form the modular pressure swing adsorption apparatus. The production capacity of the apparatus is simply changed by changing the number of manifold heads and related adsorber columns mechanically coupled together.

BRIEF DESCRIPTION OF THE DRAWINGS

The principles of the invention will be more readily understood by reference to the description of preferred embodiments thereof given herein below in conjunction with the drawings which are briefly described as follows.

FIGS. 3(a) and 3(b) are an illustration of a preferred embodiment of a modular, stacked pressure swing adsorption gas concentrator constructed according to the principles of the invention from differing elevations and in partial cross section.

DETAILED DESCRIPTION OF THE PREFERRED EMBODIMENTS

Figure 1:
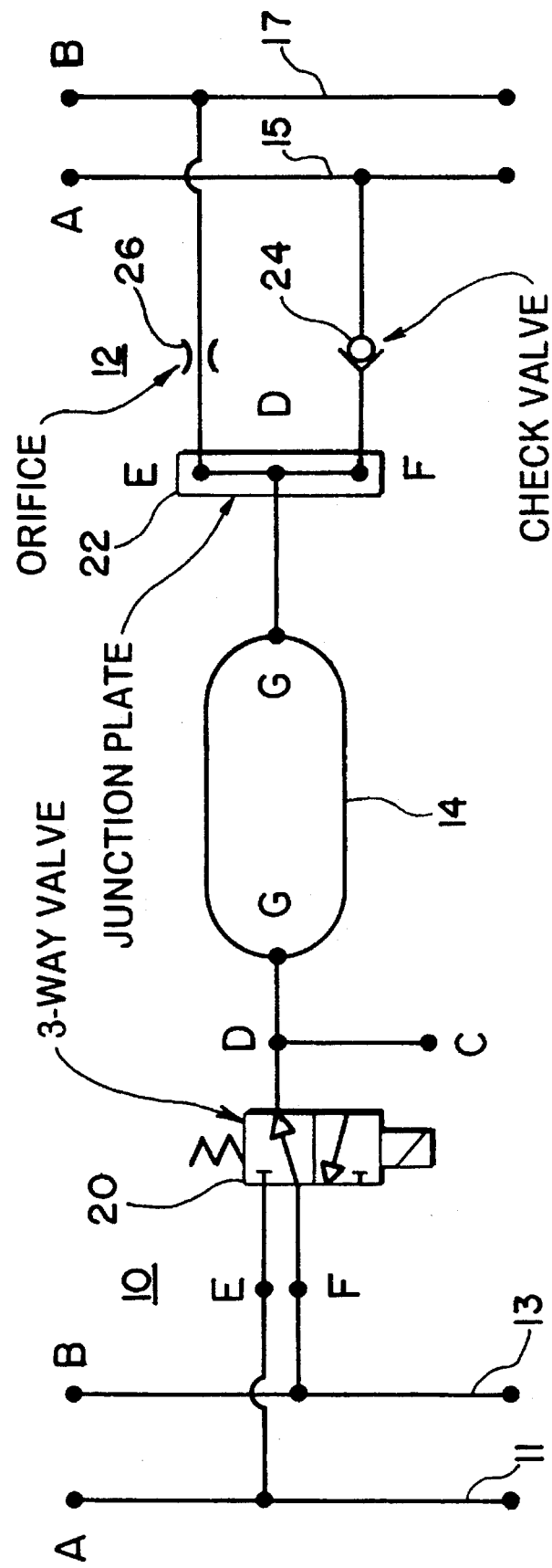
FIG. 1 is a schematic drawing representing a single adsorber column constructed according to the principles of the invention which utilizes the novel manifold heads according to the invention.

FIG. 1 is a schematic representation of a single adsorber column gas concentrator which is illustrative of the port configuration of the manifold head structure constructed according to the invention. In this figure, as well as in the other figures, each of the individual ports is labelled with a different letter of the alphabet, and this lettering scheme shall apply throughout each figure of the drawings. Each letter refers to the same port of the manifold head in each of the figures. The manifold head structure itself will be described in greater detail herein below in connection with FIGS. 2 and 3.

In FIG. 1 a single adsorber column 14 which is a molecular sieve bed of conventional construction is connected to vent gas line 11 and feed gas line 13 via manifold head 10 and to product gas line 15 and purge gas line 17 via manifold head 12. In each of the manifold heads 10 and 12 there are, respectively opposed pairs of ports A and B on opposite sides of the structure forming channels through the manifold head structure. In this embodiment manifold head 10 uses port B to provide a channel for a feed gas line 13 and port A provides a channel for a vent gas line 11. In the same manifold head 10 port E connects a component mounting pad (not shown) to port A thereby connecting a three way solenoid valve 20 to that port. Similarly, port F connects the same component mounting pad to port B thereby connecting the three way solenoid valve 20 to that port, as well. Port D connects the component mounting pad to port G in manifold head 10, which is in communication with the interior of adsorber column 14. In this case, port C is an auxiliary port for accessing the interior of the adsorber column through ports D and G. Port C can be used for a sensing a line or boost compressor drive. A boost compressor may be provided as shown in commonly assigned U.S. patent application Ser. No. 068,762, filed May 28, 1993, now U.S. Pat. No. 5,354,361.

Manifold head 12 is a product head from which product gas might emanate on line 15. In this case, line 17 is a purge gas line. A junction plate 22 (to be shown in greater detail herein below) is provided on manifold head 12 to allow communication of ports D, E and F, one with the other. A check valve 24 communicates port F with port B in line 15 to allow unidirectional flow of product gas from port F through port B. An orifice 26 communicates port E with port A in line 17 to allow a predetermined flow of purge gas to flow to and/or from port A.

Figure 2A:
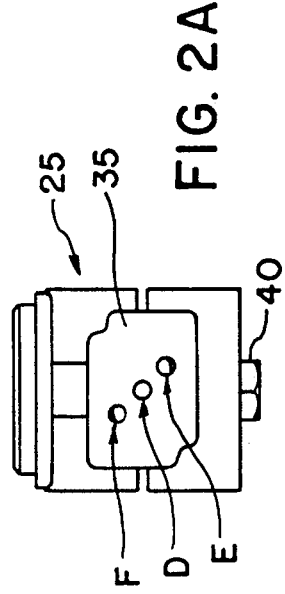
FIGS. 2(a) through (g) are a plurality of perspective views from differing elevations of a preferred embodiment of a manifold head structure constructed according to the principles of the invention.
Figure 2E:
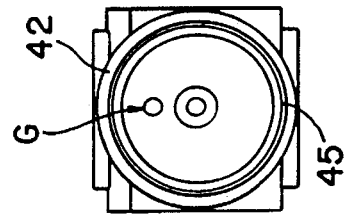
Figure 2D:
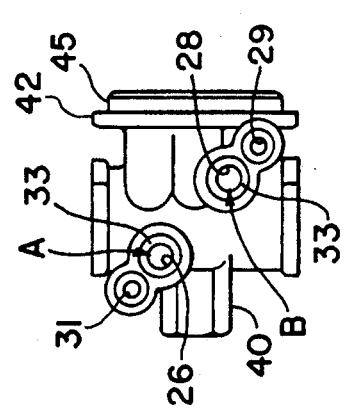
Figure 2C:
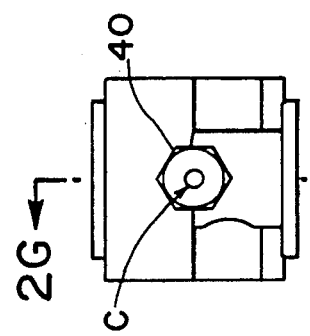
Figure 2B:
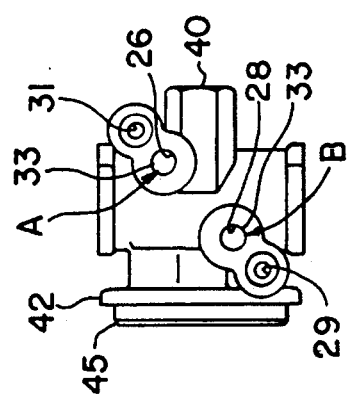
Figure 2G:
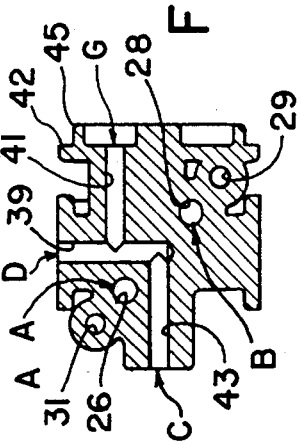
Figure 2F:
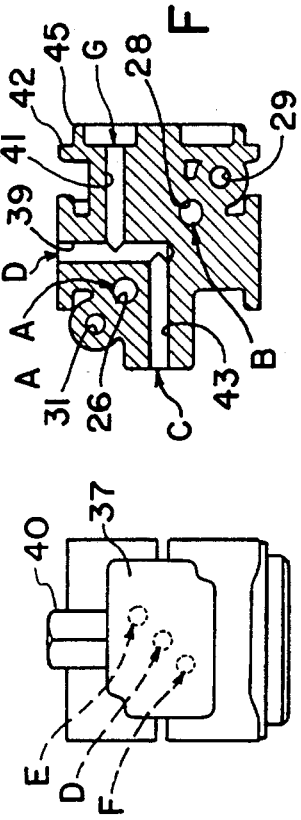

FIGS. 2(a) through (f) provide perspective views of a manifold head structure 25 constructed according to the principles of the invention from differing elevations. FIG. 2(g) is a cross sectional view taken along the line Z—Z in FIG. 2(c). FIG. 2(a) is a top elevational view of the manifold head, and FIG. 2(f) is a bottom elevation. FIGS. 2(b) and 2(d) are side elevational views, while FIGS. 2(c) and 2(e) are, respectively, front and rear elevational views.

The detail shown in these figures is equally applicable to the manifold head structures 10 or 12 in FIG. 1. However, the product gas manifold head 12 would not have a port C as shown in these figures. Rather, that portion of the structure is used for providing a through hole in the product head to allow for the fastening of a tie rod to secure the assembly together, as shown in greater detail in FIG. 3.

The pairs of ports A and B form, respectively through channels 26 and 28 through the FIG. 2 modular head structure. In addition, on the same surfaces of the modular head structure are provided fastener clearance holes which provide fastener channels 29 and 31. When a plurality of adsorber columns are used together, these fastener clearance channels allow the modular head structures to be fastened together, and the channels 26 and 28 extending through the various ports A and B of the modular head structures extend continuously. The sealing of the passages formed by the ports A and B from the exterior of the manifold is provided by pre-formed packings 33, for example, O rings in areas located about ports A and B, respectively. In fact, it should be remembered that throughout the apparatus being described wherever it is necessary to provide seals to prevent spurious pneumatic communication or leakage similar pre-formed seals are used. In the interest of conciseness and ease of description these may not be mentioned further below.

The manifold head is provided on the top and bottom, respectively, with component mounting pads 35 and 37 which are adapted to receive pneumatic circuit components such as valves (such as the 3-way solenoid valve 20 in FIG. 1) or a termination plate (such as termination plate 22 shown in FIG. 1). Port D is in pneumatic communication with port G via channels 39 and 41. Likewise, port C is in communication with the latter two ports via channel 43 and channels 39 and 41. Thus, a common pressure node is formed.

As previously indicated, the manifold head 25 is a feed air manifold head structure. As shown in FIG. 1, it is necessary also to provide for product gas manifold head structures. The two types of manifold heads are identical with the exception that port C which extends through stem 40 is replaced by a through hole (shown in FIG. 3) which allows for a tie rod to pass through the product head to secure the feed head and adsorber columns to the product head and secure the assembly together.

At the rear of manifold head 25, shown in FIG. 2(e), is provided with a circular flange structure 42 an interior shoulder 45 for receiving a cylindrically shaped adsorber column. Within the interior of circular flange 42 will be found port G which provides for pneumatic communication with the adsorber column attached as described. As earlier mentioned, pre-formed packings (not shown) are provided to provide a seal for this pneumatic connections.

FIG. 3(a) is a side elevational view, in partial cross section, of a series assembly of two adsorber columns forming a pressure swing adsorption gas concentrator apparatus according to the invention. FIG. 3(b) is a top view of the FIG. 3(a) apparatus.

Referring to FIG. 3(a) there is shown a feed air manifold head 25 like that shown in FIGS. 2(a)–(g). A molecular sieve bed or adsorber column 46 separates the latter manifold head from a product gas manifold head 45. The assembly of two manifold heads and an adsorber column are fastened together by a tie rod 48.

As stated, the feed air manifold head 25 is constructed as shown in FIGS. 2(a) through (g). Accordingly, like reference numerals indicate like parts in this figure as well. However, certain additional details of the manifold head are more clearly shown in this figure. The pairs of ports A forming channel 26 are in fluid communication with port E via a channel 53. A channel 51 extends from port F to the channel 28 formed by pairs of ports B. An auxiliary port 52 is connected to port C to, for example, provide access for a boost compressor or other applications as deemed necessary.

A 3-way solenoid valve 50 is provided to control the flow between adsorber column 46 and the manifold head 25. Functionally, this solenoid valve is connected in the same way as is solenoid valve 20 in FIG. 1.

Adsorber column 46 is a tube shaped pressure vessel filled with a molecular sieve material 49. The adsorber column tube 46 abuts the flange portion 42 of manifold head 25 and rests on the shoulder 45 thereof. A retaining spring 52 holds in place a perforated plate 56 which retains the sieve material within the tube. A foam filter element 54 is placed between the perforated plate and the sieve material. A similar perforated plate arrangement 58 is provided at the product head end of the adsorber column. When assembled, these parts are held in compression by tie rod 48 threaded into manifold head 25 at 41.

The product gas manifold head 45 is constructed very much like head 25. The adsorber column tube 46 is received in manifold head 45 in the same manner as was the case with head 25. Port G is in fluid communication with the adsorber column and channel 59 communicates port G with port D via channel 61. Channel 63 communicates port F with a lateral channel 65 which ends in the opposed pair of ports B. Opposed pair of ports A forms channel 67 which is in pneumatic communication with channel 69 thereby connecting ports A to port E.

Ports D, E and F terminate in junction plate 60 which in this case forms the latter two ports into a common connection. A check valve 62 is installed in port E, and an orifice flow restrictor is installed in port F. Thus, the communication from port E to the channel 67 formed by ports A is controlled by a check valve, while an orifice flow restrictor controls the fluid communication between port F and the channel 65 formed between ports B.

A stem 66 extends from the structure of manifold head 45, but instead of housing another auxiliary port C as was the case with manifold head 25, this stem simply forms a bushing for tie rod 48. A retaining nut 68 threaded on the tie rod holds the manifold heads 45, 25 and the tubular adsorber column 46 in compression and they are thereby fastened together.

Fastener clearance holes 71 and 73 are provided in manifold head 45 to allow this manifold head to be fastened to others to form a stacked, modular PSA system.

FIG. 3(b) is a side view of the assembly illustrated in FIG. 3(a). This exemplary embodiment consists only of two adsorber columns, but any number can be used. In this figure, each adsorber column assembly uses like references numerals to indicate like parts.

FIG. 3(B) shows the adsorber column assembly described in FIG. 3(A) in side cross section, and the second adsorber column assembly is a line drawing showing a side perspective view. As indicated above, the construction of this second adsorber column assembly is identical to that described above. In order to form this series assembly, it is necessary only to fasten the two feed air manifold heads together through fastener clearance holes 29 and 31 and to fasten the two product gas manifold heads together through fastener clearance holes 71 and 73. With the addition of termination plates 76(a)–(d) to terminate the ports A and B in the four manifold heads the assembly is completed. The termination plates, as indicated, provide terminations for outputs from the ports A and B in each of the feed air and product gas manifold heads.

Figure 4:
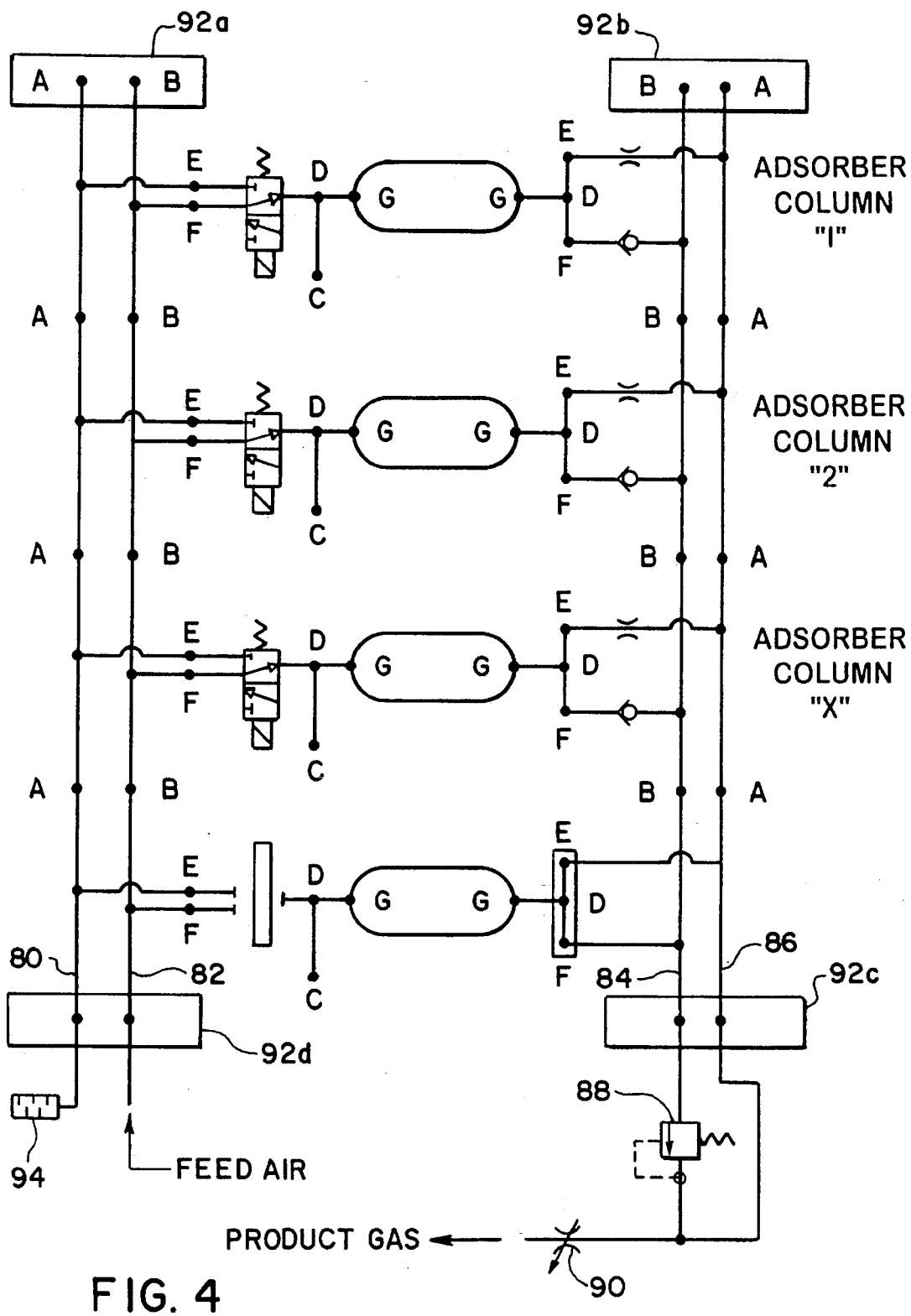
FIG. 4 is a schematic diagram of a complete modular pressure swing adsorption gas concentrator system, which is constructed according to the principles of the invention.

FIG. 4 in schematic form represents a typical multi adsorber column assembly made possible by the manifold head structure according to the invention. The system represented in this figure operates according to the pressure swing adsorption process described herein above.

The system illustrated in this figure includes a number of adsorber columns 1 through X connected in parallel. In addition, a plenum column is provided, also connected in parallel with the adsorber columns and the same manifold head structures can be used to communicate with the plenum.

In this assembly, a feed air line 82 is formed by the channels extending through the ports B in the various manifold head structures; a purge gas line 80 is formed by the channel extending through the ports A in the same manifold head structures. A product gas line 84 is formed by the channels extending through the ports B in the product gas manifold head structures at the other end of the adsorber column, and a purge gas line 86 is formed by the channels extending through the ports A in those same manifold head structures. In this case, a pressure regulator 88 and needle valve 90 are provided to control the flow of product gas to the exterior, as well as controlling purge gas flow back to those adsorber columns being recharged.

Termination plates 92(a)–(d) are provided to either terminate or allow access to the channels 80, 82, 84 and 86 as shown schematically in FIG. 4. For example, termination plates 92(a) and 92(b), respectively, simply terminate lines 80, 82 and 84, 86. Termination plate 92(d) provides a exit for the vent gas on line 80 to a silencer 94, and it also supplies access to line 82 for the feed air to be processed. As indicated above, termination plate 92(c) provides access to product gas line 84 and purge gas line 86.

The FIG. 4 system, as described, illustrates the ease with which a PSA gas concentrator system of a desired capacity can be formed making use of the principles of this invention.

The principles of the invention have been described herein above by describing the construction and operation of preferred embodiments. It is to be remembered that the described embodiments can be modified or changed without departing from the spirit and scope of the invention as defined by the appended claims.

We claim:

1. A modular, stackable gas concentrator operating according to the pressure swing adsorption (PSA) process, comprising:

a plurality of adsorber columns, each said adsorber column having inlet gas and product gas ends, a plurality of manifold heads of like construction, each said manifold head having channels and ports formed therein and means for carrying pneumatic components said channels, ports and means for carrying being adapted to be arranged to perform either one of inlet gas end or product gas end pneumatic circuit functions in the PSA process, those of said manifold heads arranged as inlet manifolds being fastened and pneumatically coupled to said inlet gas ends of said adsorber columns and those of said manifold heads being arranged as product gas manifolds being fastened and pneumatically coupled to said product gas ends of said adsorber columns and means for fastening said inlet manifolds and said product manifolds, respectively, so that ports therethrough form at least continuous pneumatic connections to a source of inlet gas and a receptacle for product gas, said adsorber columns forming a pneumatically parallel arrangement, whereby the gas concentrator may be changed in capacity by selectively adding or removing one or more adsorber columns and related manifold heads.

\* \* \* \* \*